United States Patent [19]

Magnuson et al.

[11] 4,126,169
[45] Nov. 21, 1978

[54] COVER FOR SPARE WHEEL AND TIRE

[76] Inventors: Howard W. Magnuson; Juanita C. Magnuson, both of P.O. Box 3052, Yakima, Wash. 98903

[21] Appl. No.: 837,432

[22] Filed: Sep. 28, 1977

[51] Int. Cl.² ............................................. B65D 85/06
[52] U.S. Cl. .................................................. 150/54 B
[58] Field of Search ....................... 150/54 B; 206/304

[56] References Cited

U.S. PATENT DOCUMENTS

| 1,461,021 | 7/1923 | Bate | 150/54 B |
| 1,696,009 | 12/1928 | McCormick | 150/54 B |
| 1,704,555 | 3/1929 | Cluff | 150/54 B X |
| 2,109,504 | 3/1938 | Ringler | 206/304 |

FOREIGN PATENT DOCUMENTS 1,455 of 1915 United Kingdom ................... 150/54 B Primary Examiner—Donald F. Norton
Attorney, Agent, or Firm—Roy E. Mattern, Jr.

[57] ABSTRACT

One size cover, rather than many sizes of covers, is made to fit many sizes of spare wheels and tires mounted on the exteriors of vehicles. The excess materials of each cover needed to be able to cover such a wide range of spare wheel and tire sizes are pleated, hollow hemmed, drained, and drawn together with a cord slidably confined within the hollow hem, except where exposed for tieing. Two pieces of covering material are used, one being a center circular panel and the other being a wide circumferential strip of material which is pleated and joined to the center circular panel along one edge, and hollow hemmed along the other edge to receive the draw cord.

1 Claim, 4 Drawing Figures

COVER FOR SPARE WHEEL AND TIRE

BACKGROUND OF THE INVENTION

As indicated by patents issued many years ago such as U.S. Pat. Nos. 1,504,907; 1,704,555; 1,718,969 and particularly U.S. Pat. No. 1,461,021, issued to W. G. Bate in 1923, the spare tires and spare wheels and tires carried on the exteriors of vehicles were oftentimes covered to improve the appearance of the spare tire assembly and the overall appearance of the vehicles. Thereafter, and in more recent times, spare wheels and tires were stored inside of trunks and fender wells and no appearance covers had to be used and they were not used. In comparatively recent times, especially in reference to recreational vehicles and small trucks and vans, spare wheel and tire combinations are being mounted again on the exterior of vehicles. Those merchants supplying the current market with covers for spare wheels and tires must necessarily stock many sizes of covers to respectively fit the various sizes of tires and spare wheels. In contrast by selecting from only two cover sizes of those set forth in the following description, and illustrated in the drawings, the merchant supplies all the needs of those who request a tire cover to place over and around exteriorly mounted tires and spare wheels. Moreover, the tire cover is neat in appearance even though many pleats are utilized.

SUMMARY OF THE INVENTION

Many vehicles today are again carrying spare tires and spare wheels on the exteriors, and to improve the appearance of the assembly of such a spare tire and wheel and also the overall vehicle, covers are also being used, many with artistic decorations. However, there are many wheel sizes, tire sizes, and tire types, and as a consequence merchants are stocking many sizes of covers. By contrast by using only two sizes of the illustrated and described, pleated, drained, and draw cord embodiments, a merchant is able to supply substantially all customers with an attractive well drained cover for their spare tire and wheel.

In a preferred embodiment of the vehicle spare wheel and tire cover, there is a center circular panel smaller in diameter than the smallest face of any tire to be covered among several sizes of tires. To this is joined a wide circumferential strip of material to fit over the curved circumference of a tire. It is pleated and joined along one front circumferential side to the center circular panel, commencing with a box pleat at the top, and then including several pleats around the circumference and ending with an inverted pleat at the bottom, all the pleats being arranged so rain water will drain downwardly outside of the strip and center panel. The rear circumferential side is formed with a near continuous hollow infold hem and terminates at the bottom with a closable gap. A draw cord is inserted throughout the continuous hollow infold and is extended beyond for drawing and tieing.

DESCRIPTION OF THE DRAWINGS

A preferred embodiment of the vehicle spare wheel and tire cover is illustrated in the drawings, wherein.

DESCRIPTION OF THE PREFERRED EMBODIMENT

Figure 1:
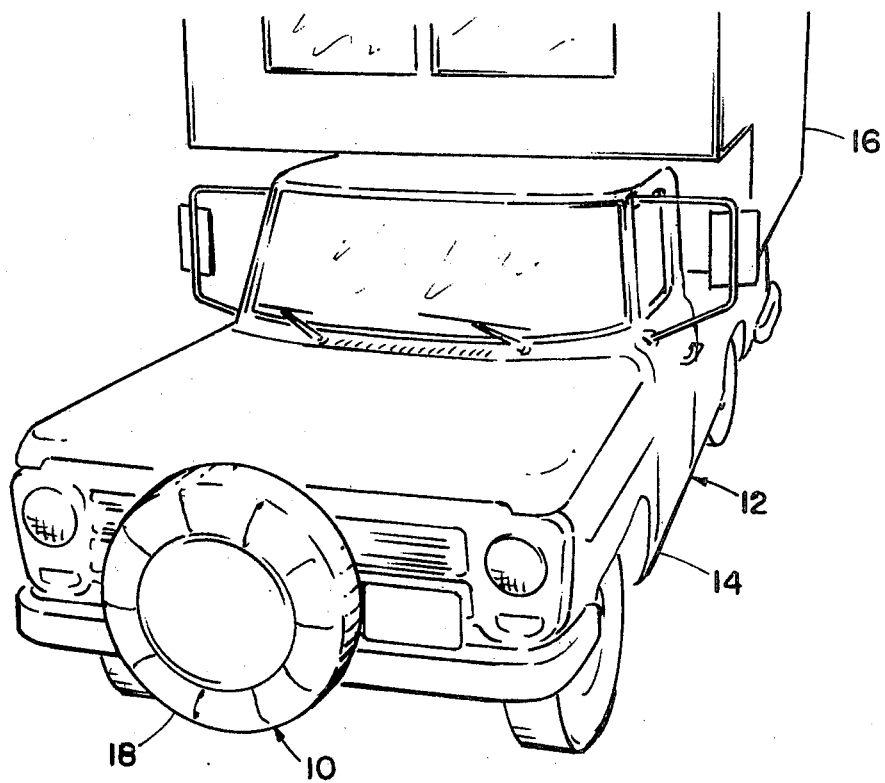
FIG. 1 is a partial front perspective view of a pickup truck and camper combination, typical of many vehicles now carrying a covered spare wheel and tire on the outside of the vehicle.

The vehicle spare wheel and tire cover illustrated in the drawings, manufactured in only two sizes, substantially fits all spare tire and wheel assemblies. The resulting appearance of both the covered spare tire and wheel assembly 10 and the overall vehicle 12, for example a pickup truck 14 carrying a camper 16, and supporting the exteriorly mounted covered assembly, is illustrated in FIG. 1.

Figure 2:
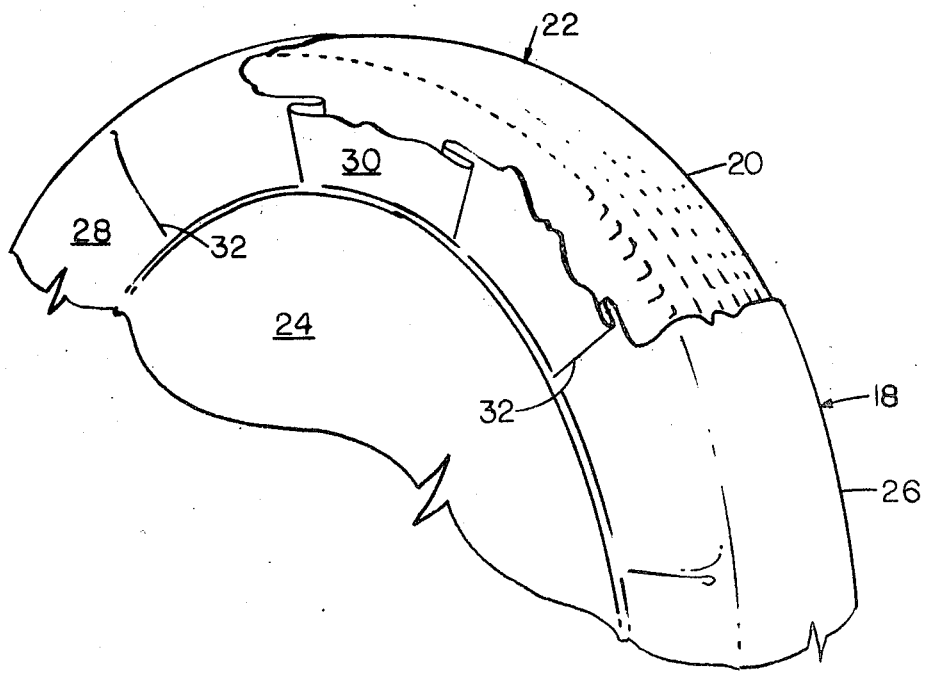
FIG. 2 is a partial front perspective view with portions removed of the cover for the spare wheel and tire to illustrate the self draining large pleats which give the fullness necessary for the tire to be fitted throughout a wide range of tire and wheel sizes.

The arrangement of materials of the cover 18, in reference to the top 20 of the tire 22 being covered, are shown in FIG. 2. A center circular panel 24 of material preferably smaller in diameter than the smallest face of any tire 22 to be covered, among several sizes of tires, is centered on the outside or viewing side of the mounted covered spare tire and wheel assembly 10.

A wide circumferential strip 26 of material is adapted for fitting over the curved circumference of a tire 22, which is one size of many sizes to be covered. This circumferential strip 26 is pleated and joined along one front, i.e. outside, circumferential side 28 of the strip 26, to the center circular panel 24. The pleating commences at the top with a box pleat 30 and then on either side with uniquely arranged side pleats 32. The box 30 and side 32 pleats are folded and positioned so rain water will always drain downwardly outside of the wide circumferential strip of material 26 and the center panel 24.

Figure 3:
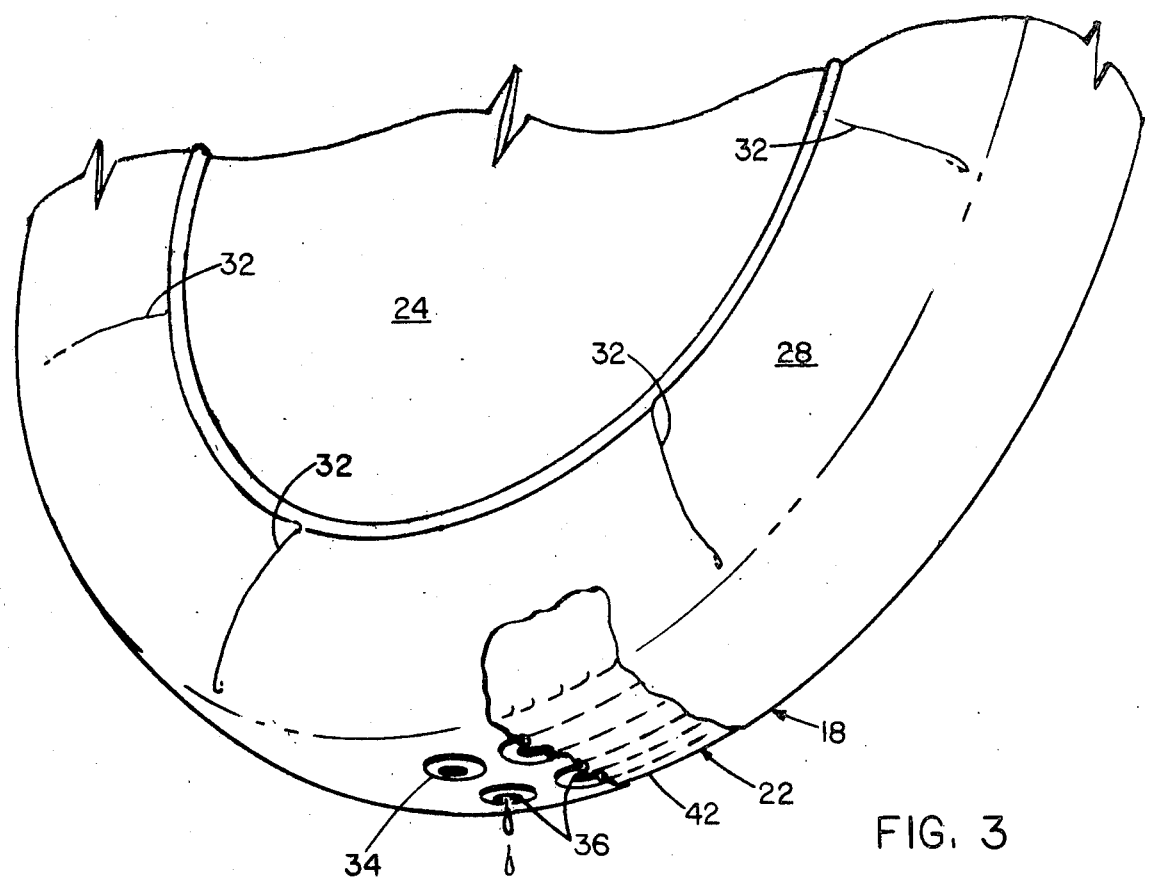
FIG. 3 is a partial front perspective view with portions removed of the cover for the spare wheel and tire to further illustrate the pleats and also the drain holes serving to clear any water possibly collecting inside the cover, such as water entering from the rear during a heavy rain.
Figure 4:
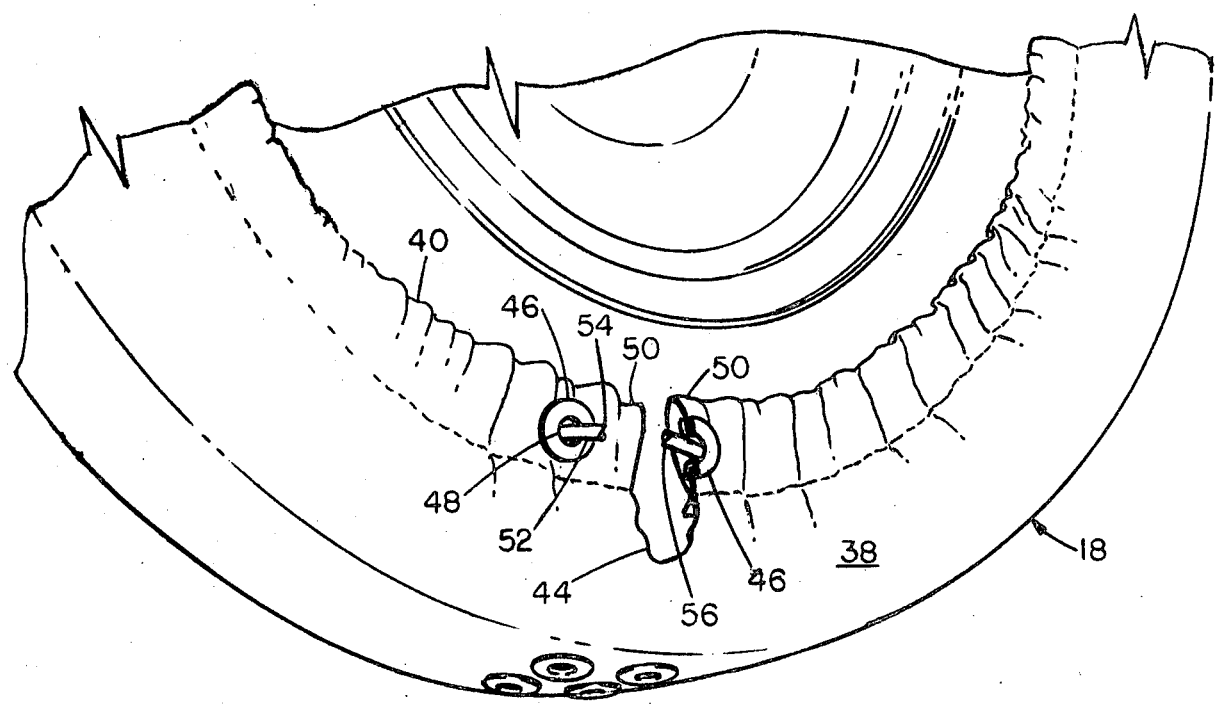
FIG. 4 is a partial rear perspective view illustrating the drain holes, the hollow hem, and draw cord emerging from the hollow hem, indicating how the cover is tied tightly to various sizes of spare wheels and tires.

Any rain water or water which might, from reverse directions, such as during the washing of the vehicle, get inside the covered spare wheel and tire assembly 10, drains downwardly and out through grommeted 34 drain holes 36, illustrated in FIG. 3. The drainable side pleats 32 continue on along the sides of the cover 18.

The rear or inside circumferential side 38 of the wide circumferential strip 26 or cover 18 is formed with a substantially continuous hollow infold hem 40 terminated at the bottom 42 of the tire 22 at the rear with a closable gap 44 of the wide circumferential strip 26. Grommeted 46 holes 48 are located at the respective terminals 50 of the hollow infold hem 40.

A draw cord 52 is inserted throughout and beyond the hollow infold hem 40 with its respective ends 54, 56, leaving through the grommeted 46 holes 48. These cord ends 54, 56 extend beyond the closable gap 44, so a large number of sizes of covered vehicle spare wheel and tire assemblies 10 may be covered by one starting size of the cover 18.

Generally only two sizes of covers 18 are stocked by a merchant, who then is able to furnish these covers 18 to any customer. The covers 18 enhance the appearance of the exteriorly mounted assemblies 10 and the overall vehicle itself. At all times rain water drains from the covered vehicle spare wheel and tire assembly 10 and the components of the cover 18 remain snugly in place.

We claim:

1. A vehicle spare wheel and tire cover with one size of this tire cover to fit many sizes of spare wheels and tires, having multiple drainable pleats throughout the circumference and drain holes at the bottom, and a draw cord at the rear, all arranged to cover many sizes of vehicle spare wheel and tire combinations, which are carried on the exteriors of vehicles to thereby protect the tires and enhance the overall appearance of the vehicles, comprising:

(a) a center circular panel smaller in diameter than the smallest face of any side wall of a tire to be covered among several sizes of tires mounted on wheels;

(b) a wide circumferential strip of material to fit over the curved circumference of a tire to be covered among several sizes of tires, first pleated and then joined along one front circumferential side of the material to the center circular panel, commencing with a drainable box pleat at the top to drain water to the respective sides, and then including several drainable pleats around the circumference to continue the respective drainage of water downwardly, and ending with an inverted drainable pleat at the bottom to continue draining the water, whereby all these pleats are arranged so rain water will drain downwardly outside on both sides of the strip and over the center panel of material, and the rear circumferential side of material, covering the other side wall of the tire, having a continuous hollow infold terminating at the bottom with a closable gap;

(c) a draw cord inserted throughout the continuous hollow infold of the rear circumferential side of material with the ends of the draw cord extending out from this infold before reaching the gap for tieing across the closable gap, so this vehicle spare wheel and tire cover is snugly fitted to one selected set of a large number of different sizes of these sets of mounted vehicle spare wheel and tire combinations in turn mounted on the exteriors of vehicles;

(d) grommets installed in the bottom of the wide circumferential strip to create drain holes; and (e) grommets installed in the rear circumferential side of the material before the termination of the continuous hollow infold at the closable gap, through which the draw cord ends are passed to be later pulled together and tied to close the gap and hold the tire cover on the wheel.

* * * * *